US010325292B2

(12) United States Patent
Sanio et al.

(10) Patent No.: US 10,325,292 B2
(45) Date of Patent: Jun. 18, 2019

(54) ADJUSTING ADVERTISER BIDS BASED ON SERVICE AVAILABILITY

(71) Applicant: Google LLC, Mountain View, CA (US)

(72) Inventors: Jason Robert Richard Sanio, Sunnyvale, CA (US); Courtney Hampson, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 1031 days.

(21) Appl. No.: 14/530,267

(22) Filed: Oct. 31, 2014

(65) Prior Publication Data

US 2016/0125475 A1 May 5, 2016

(51) Int. Cl.
G06Q 10/00 (2012.01)
G06Q 30/02 (2012.01)
G06Q 10/02 (2012.01)

(52) U.S. Cl.
CPC ......... G06Q 30/0275 (2013.01); G06Q 10/02 (2013.01)

(58) Field of Classification Search
None
See application file for complete search history.

(56) References Cited

U.S. PATENT DOCUMENTS

| 5,864,818 | A * | 1/1999 | Feldman | G06Q 10/02 |
| | | | | 705/5 |
| 6,619,670 | B2 * | 9/2003 | Alberici | B23Q 1/0036 |
| | | | | 279/137 |
| 7,624,065 | B2 * | 11/2009 | Schoen | G06Q 40/04 |
| | | | | 705/37 |
| 8,630,897 | B1 | 1/2014 | Prada-Gomez et al. | |
| 8,719,081 | B1 | 5/2014 | Langrock et al. | |
| 2001/0032175 | A1 * | 10/2001 | Holden | G06Q 30/0601 |
| | | | | 705/37 |
| 2001/0039528 | A1 * | 11/2001 | Atkinson | G06Q 30/08 |
| | | | | 705/37 |
| 2001/0042041 | A1 * | 11/2001 | Moshal | G06Q 30/06 |
| | | | | 705/37 |
| 2002/0002529 | A1 * | 1/2002 | Tokiwa | G06Q 10/02 |
| | | | | 705/37 |
| 2002/0016760 | A1 * | 2/2002 | Pathak | G06Q 30/0601 |
| | | | | 705/37 |

(Continued)

Primary Examiner — Tonya Joseph
(74) Attorney, Agent, or Firm — Fish & Richardson P.C.

(57) ABSTRACT

An advertising system receives, from a merchant system, marketing information, bidding preferences for auctions for advertising spaces, and a merchant system reservation calendar comprising an availability for the merchant system. The advertising system receives a notice of an auction for an advertising space from an advertising platform. The advertising system determines a first bid for the auction based on the availability of the merchant system, the marketing information, and the merchant system's bidding preferences and transmits the first bid to the advertising platform. The advertising system receives a notice of an incomplete auction from the advertising platform. The advertising system receives, from the merchant system, an updated merchant system reservation calendar comprising an updated availability and determines a second bid for the advertising space auction. The advertising system transmits the second bid to the advertising platform. The advertising system receives a notice of a completed auction from the advertising platform.

20 Claims, 7 Drawing Sheets

(56) References Cited

U.S. PATENT DOCUMENTS

| | | | | |
|---|---|---|---|---|
| 2002/0059101 A1* | 5/2002 | Ratliff | ............... | G06Q 30/0207 |
| | | | | 705/14.1 |
| 2002/0077962 A1* | 6/2002 | Donato | ................. | G06Q 40/04 |
| | | | | 705/37 |
| 2002/0082978 A1* | 6/2002 | Ghouri | .................. | G06Q 30/08 |
| | | | | 705/37 |
| 2002/0169704 A1* | 11/2002 | Gilbert | .................. | G06Q 40/04 |
| | | | | 705/37 |
| 2003/0050861 A1* | 3/2003 | Martin | .................. | G06Q 30/08 |
| | | | | 705/26.3 |
| 2003/0061145 A1* | 3/2003 | Norrid | .................. | G06Q 10/02 |
| | | | | 705/37 |
| 2003/0191725 A1* | 10/2003 | Ratliff | ............... | G06Q 30/0283 |
| | | | | 705/400 |
| 2004/0199462 A1* | 10/2004 | Starrs | .................... | G06Q 20/10 |
| | | | | 705/39 |
| 2004/0225551 A1* | 11/2004 | Hole | ...................... | G06Q 10/10 |
| | | | | 705/500 |
| 2006/0200370 A1* | 9/2006 | Ratliff | .................... | G06Q 10/02 |
| | | | | 705/5 |
| 2007/0087756 A1* | 4/2007 | Hoffberg | ............ | G06Q 10/0631 |
| | | | | 455/450 |
| 2011/0276452 A1* | 11/2011 | Stephens | ............. | G06Q 10/087 |
| | | | | 705/35 |
| 2012/0143662 A1 | 6/2012 | Heath | | |

* cited by examiner

ADJUSTING ADVERTISER BIDS BASED ON SERVICE AVAILABILITY

TECHNICAL FIELD

The present disclosure relates generally to improving the electronic bidding process for electronic auctions for electronic advertising spaces.

BACKGROUND

Advertisers maximize the value of advertising by efficiently selecting advertising spaces that effectively produce conversions. In the service industry, users may be more likely to purchase a service or a product at certain times or at a certain length of time before the performance of the service. For example, in certain service industries a user may be unlikely to purchase or reserve a service more than one week ahead of performance of the service while in other service industries a user may be likely to reserve a service months ahead of performance of the service. Additionally, merchants seeking to advertise obtain the most benefit from advertising during times of high availability of merchant services. For example, merchants obtain less benefit from advertising as user reservations for a service approach the capacity of the merchant to provide the service and obtain more benefit from advertising during times at which user reservations are low with respect to the merchant's capacity to provide the service.

SUMMARY

Techniques herein provide computer-implemented methods to adjust bids for electronic advertising spaces based on merchant system availability. In an example embodiment, an advertising system receives, from a merchant system, a merchant system reservation calendar comprising an availability for the merchant system, marketing information, and bidding preferences for auctions for advertising spaces. The advertising system receives a notice of an auction for an advertising space from an advertising platform. The advertising system determines a first bid for the auction based on the availability of the merchant system, the marketing information, and the merchant system's bidding preferences. The advertising system transmits the first bid for the auction to the advertising platform. The advertising system receives a notice of an incomplete auction from the advertising platform. The advertising system receives, from the merchant system, an updated merchant system reservation calendar comprising an updated availability for the merchant system and determines a second bid for the advertising space auction based on the updated merchant system availability, the marketing preferences, and the bidding preferences for auctions. The advertising system transmits the second bid to the advertising platform. The advertising system receives a notice of a completed auction from the advertising platform and transmits the notice to the merchant system.

In certain other example aspects described herein, systems and computer program products to adjust bids for electronic advertising spaces based on merchant system availability are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
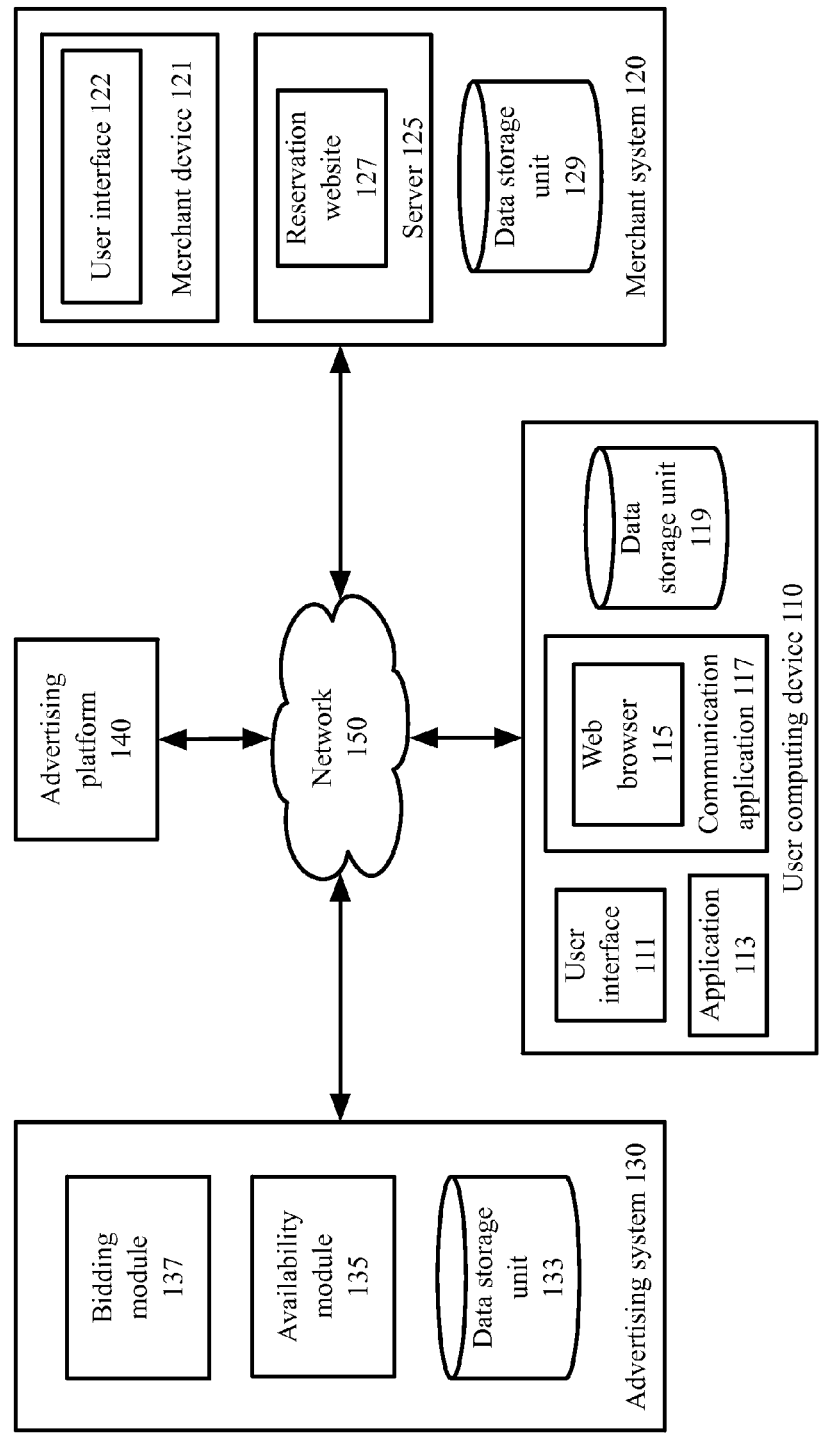
FIG. 1 is a block diagram depicting a system for adjusting bids for advertising spaces based on merchant system availability, in accordance with certain example embodiments.

The example embodiments described herein provide computer-implemented techniques for bidding and adjusting bids for advertising spaces based on merchant system availability.

In an example embodiment, an advertising system receives, from a merchant system, a merchant system reservation calendar comprising an availability for the merchant system, marketing information, and bidding preferences for auctions for advertising spaces. The advertising system receives a notice of an auction for an advertising space from an advertising platform. The advertising system determines a first bid for the auction based on the availability of the merchant system, the marketing information, and the merchant system's bidding preferences. The advertising system transmits the first bid for the auction to the advertising platform. The advertising system receives a notice of an incomplete auction from the advertising platform. The advertising system receives an updated merchant system reservation calendar comprising an updated availability for the merchant system from the merchant system and determines a second bid for the auction based on the updated merchant system availability, the marketing preferences, and the bidding preferences for auctions. The advertising system transmits the second bid to the advertising platform. The advertising system receives a notice of a completed auction from the advertising platform and transmits the notice to the merchant system.

In an example embodiment, a user accesses a merchant system website via a user computing device. For example, the user accesses the merchant website via a web browser on the user computing device. The user selects an option to make a reservation with the merchant system. In an example embodiment, the merchant system is a service industry wherein the industry custom is for users to purchase tickets or make reservations at a time before the merchant system performs a service. For example, the merchant system may be a restaurant chain, a medical service, or a transportation service. The merchant system incorporates the user reservation into a merchant system reservation calendar.

In an example embodiment, the merchant system comprises a reservation calendar that the merchant system uses to determine availability. For example, an airline merchant system keeps a log of seating availability for each flight for each calendar day. For example, if the airline merchant system has reserved 50 seats out of a 250 seat airplane and 200 seats are available to purchase or reserve, the airline determines that the flight is at 80% availability. Likewise, a hotel merchant system may determine guest room availability, a restaurant merchant system may determine table availability, and a doctor's office merchant system may determine appointment availability using a reservation calendar. In another example embodiment, the reservation calendar is managed by an advertising system and the merchant system accesses the reservation calendar via a network to log user reservations or purchases.

The merchant system allocates funds for an advertising system. For example, the merchant system enters into an agreement with the advertising system for the advertising system to provide advertising services for merchant system. In this example, the merchant system allocates a certain amount of funds for the advertising system to spend over a predetermined time period. For example, the advertising system may spend the allocated funds on advertisement space with one or more advertising platforms, such as websites, television, radio, or paper advertisements. In an example embodiment, the advertising system bids for advertisement space with one or platforms against other advertising systems or merchant systems in advertisement space auctions. For example, multiple merchants and/or advertising systems bid for a 24 hour ad space on a website.

The merchant system transmits marketing information to the advertising system. In an example embodiment, the merchant system transmits statistics concerning the merchant system or the industry associated with the merchant system. In an example, marketing information comprises a statistical distribution of the customers with respect to the length of time users make reservations before the merchant system renders a performance of service associated with the reservations. For example, the merchant system transmits an average time in advance that customers generally reserve or purchase services or products with the merchant system. In an example, the merchant system transmits statistics that show that 25% of customers reserve a service between a month ahead of time and two weeks ahead of time, 50% of customers reserve a service within two weeks ahead of time and two days ahead of time, and 25% of customers reserve a service within two days ahead of time and the time of service. In this example, "ahead of time" means a time before the merchant system renders a service or product to the customer as part of a customer's transaction. The merchant system allows the advertising system access to the merchant system reservation calendar. In an example embodiment, the merchant system allows the advertising system continuous access to the merchant system reservation calendar. For example, the advertising system has remote access the merchant system reservation calendar or a merchant system server periodically or continuously transmits updates of the merchant system reservation calendar to the advertising system. In another example embodiment, the advertising system maintains the merchant system reservation calendar.

The merchant system defines bidding parameters. For example, the merchant system defines a low bidding threshold, a high bidding threshold, and acceptable bidding intervals according to availability. For example, the merchant system may define $1.00 as a low bidding threshold for a 24 hour advertising space on a website and $100.00 as the high bidding threshold. In this example, the merchant system may define $1.00 as an acceptable bid when the merchant is at 100% availability and $100.00 as an acceptable bid when the merchant system is at 0% availability. In this example, the merchant system may instruct the advertising system to increase the bid for the advertising space by $1.00 or each decrease in availability of 1% and decrease the bid for the advertising space by $1.00 for each increase in the availability of 1%. For example, if the current bid was $40.00 and the availability decreased by 5%, the bidding parameters would instruct the advertising to increase the bid by $5.00 to $45.00. In another example embodiment, the bidding parameters may instruct the advertising system to further increase or decrease the bid for the advertising space based on the transmitted marketing preferences. For example, if the marketing information observes that most customers wait until a few days ahead of time to make a reservation or purchase a service from a merchant system, the merchant system may instruct the advertising system to make low bids when the advertising time slot is two weeks ahead of time, even if the availability is low. The advertising system receives the merchant system bidding preferences. In an example embodiment, the merchant system bidding preferences comprise the allocated funds, the marketing information, and the bidding parameters.

An advertising platform transmits a notice of an advertising space auction to the advertising system. In an example embodiment, the advertising platform is separate from the advertising system. In another example embodiment, the advertising system comprises or is associated with the advertising platform. For example, the advertising system maintains a website advertising platform comprising advertising space for which the advertising system hosts advertising space auctions. The advertising system receives the notice of the advertising space auction. The advertising system determines merchant system availability via the merchant system reservation calendar. The advertising system determines the initial bid for the auction based on the merchant availability and marketing information. The advertising system transmits the initial bid on behalf of the merchant system to the advertising platform. The advertising platform receives the initial bid from the advertising system.

The advertising platform transmits notification of the progress of the auction to the advertising system. For example, the advertising platform transmits notification of the progress of the auction to the advertising system at regular intervals, for example, every five minutes. In an example, the advertising platform also transmits notification to the advertising system when an auction is completed. For example, the advertising platform transmits notification to the advertising system when the merchant system wins the auction for the advertising space or when another party wins the auction for the advertising space. The advertising system receives notification of the progress of the auction. If the auction is complete, the advertising system transmits a notice to the merchant system. In an example, the advertising system only transmits a notice to the merchant system if the merchant system wins the auction for the advertising space. In another example embodiment, the advertising system transmits a notices of completed auctions to the merchant system regardless of if the merchant system won the auction or not.

If the auction is not complete, the advertising system accesses or receives an updated merchant reservation calendar from the merchant system. The advertising system determines a new bid based on merchant bidding preferences. If the newly determined bid is not different from the previous bid, the previous bid is maintained. If the newly determined bid is different from the previous bid, the advertising system transmits the new bid to the advertising platform for the auction. The advertising platform receives the new bid. As previously discussed, when the advertising system receives a notification that the auction has been completed, the advertising system transmits a notice to the merchant system. Otherwise, the advertising system continues to receive notification of the progress of the auction, evaluates the merchant system availability, and determines whether to increase or decrease the merchant system bid for the advertising space based on the merchant availability and the marketing information.

By using and relying on the methods and systems described herein, the advertising system determines bids for electronic advertising space auctions on behalf of the merchant system based on merchant availability. By determining and making bids on behalf of the merchant system to the advertising platform, the advertising system eliminates or reduces any interaction between computing devices associated with the merchant system and the advertising platform. Additionally, by giving the advertising system access to the merchant system reservation calendar, interactions between merchant system and the advertising system are minimized. For example, in certain embodiments, the methods and systems described herein do not require the merchant system to actively submit a merchant system reservation calendar since the advertising system has periodic or continual access to the reservation calendar. As such, the systems and methods described herein may reduce the inputs required and the processing required by the merchant system. Additionally, the systems and methods described herein may improve the efficiency of merchant system advertising. For example, by decreasing the bid for advertising spaces as availability decreases, the advertising system economizes the advertising resources of the merchant system since advertising conversion is desired less as availability decreases.

Example System Architecture

Turning now to the drawings, in which like numerals indicate like (but not necessarily identical) elements throughout the figures, example embodiments are described in detail.

FIG. 1 is a block diagram depicting a system 100 for bidding and adjusting bids for advertising spaces based on merchant system availability, in accordance with certain example embodiments. As depicted in FIG. 1, the system 100 includes network computing devices 110, 120, 130, and 140 that are configured to communicate with one another via one or more networks 150. In some embodiments, a user associated with a device must install an application and/or make a feature selection to obtain the benefits of the techniques described herein.

In example embodiments, the network 150 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages, and allows for the measurement of a received signal strength indicator ("RSSI") or other similar measurement such as the free space path loss, the received channel power indicator ("RCPI"), the time of arrival ("TOA"), and/or the round trip time ("RTT"). Throughout the discussion of example embodiments, it should be understood that the terms "data" and "information" are used interchangeably herein to refer to text, images, audio, video, or any other form of information that can exist in a computer-based environment.

Each network computing device 110, 120, 130, and 140 includes a device having a communication module capable of transmitting and receiving data over the network 150. For example, each network computing device 110, 120, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, and 140 are operated by users 101, merchant system operators, advertising system operators, and advertising platform operators, respectively.

An example user computing device 110 comprises a user interface 111, an application 113, a web browser 115, a communication application 117, and a data storage unit 119.

In an example embodiment, the user interface 111 may be a touch screen, a voice-based interface or any other interface that allows the user 101 to provide input and receive output from an application or module on the user computing device 110. In an example embodiment, the user interface 111 enables the user 101 to interact with the application 113 or a web browser 117. For example, the user 101 may interact, via the user interface 111, with the application 113 or the web browser 117 to access a merchant system reservation website 127 and make, cancel, or modify a reservation with the merchant system 120.

In an example embodiment, the application 113 is a program, function, routine, applet, or similar entity that exists on and performs its operations on the user computing device 110. In certain embodiments, the user 101 must install the application 113 and/or make a feature selection on the user computing device 110 to obtain the benefits of the techniques described herein. In an example embodiment, the application 113 communicates with the merchant system reservation website 127 via the network 150. In this example embodiment, the user 101 downloads the application 113 to the user computing device 110. In an example embodiment, the user 101 may make, change, or cancel reservations for merchant system 120 services or products via the application 113. In another example embodiment, the user 101 accesses a web browser 115 application associated with the merchant system 120 to make, change, or cancel reservations with the merchant system reservation website 127.

In an example embodiment, the user 101 can use a communication application 117, such as a web browser 115 application or a stand-alone application, to view, download, upload, or otherwise access documents or web pages via a distributed network 150.

In an example embodiment, the web browser 115 can enable the user 101 to interact with web pages using the user computing device 110. In an example embodiment, the user 101 may access the merchant system's 120 reservation website 127 the web browser 117.

In an example embodiment, the data storage unit 119 comprises a local or remote data storage structure accessible to the user computing device 110 suitable for storing information. In an example embodiment, the data storage unit 119 stores encrypted information, such as HTML5 local storage.

An example merchant system 120 comprises a merchant system device 121 comprising a user interface 121, a server 125, a reservation website 127, and a data storage unit 127.

In an example embodiment, the merchant system computing device 121 comprises a user interface 122. In an example embodiment, an agent of the merchant system 120 uses the merchant system computing device 121 to transmit bidding preferences to the advertising system 130 via the network 150. In an example embodiment, the agent of the merchant system 120 may enter, modify, and/or cancel reservations from the merchant system 120 reservation calendar using the merchant system computing device 121.

In an example embodiment, the user interface 121 may be a touch screen, a voice-based interface or any other interface that allows the agent of the merchant system 120 to provide input and receive output from an application or module on the merchant system computing device 121.

In an example embodiment, the server 125 provides the content accessible by the user 101 through the web browser 115 or application 113 on the user computing device 110, including but not limited to html documents, images, style sheets, and scripts. In an example embodiment, the server 125 supports the merchant system reservation website 127.

In an example embodiment, the reservation website 127 comprises a website that enables one or more users 101 to make, change, or cancel reservations with the merchant system 120 for services or products associated with the merchant system 120. In an example embodiment, user 101 interactions with the reservation website 127 to make, change, or cancel reservations are entered, changed, or removed from a merchant system reservation calendar.

In an example embodiment, the data storage unit 127 comprises a local or remote data storage structure accessible to the merchant system 120 suitable for storing information. In an example embodiment, the data storage unit 127 stores encrypted information, such as HTML5 local storage. In an example embodiment, the data storage unit 127 stores the merchant system reservation calendar and updates to the merchant system reservation calendar.

An example advertising system 130 comprises a data storage unit 133, an availability module 135, and a bidding module 137.

In an example embodiment, the data storage unit 133 comprises a local or remote data storage structure accessible to the merchant system 120 suitable for storing information. In an example embodiment, the data storage unit 127 stores encrypted information, such as HTML5 local storage.

In an example embodiment, the availability module 135 receives and/or accesses a first merchant system reservation calendar associated with the merchant system 120 via the network 150. In an example embodiment, the availability module 135 determines the merchant system 120 availability for merchant system 120 services based on the first received reservation calendar. In another example embodiment, the first received reservation calendar comprises availability data. In this example embodiment, the availability module 135 extracts the availability data from the first received reservation calendar. In an example embodiment, the availability module 135 receives an updated merchant system reservation calendar from the merchant system 120 via the network 150 or otherwise accesses an updated merchant system reservation calendar via the network 150. In an example embodiment, the availability module 135 determines an updated merchant system 120 availability based on the updated reservation calendar in a similar manner to which the availability module 135 determined the availability based on the first received reservation calendar. In an example embodiment, the availability module 135 communicates availability data associated with the first merchant system reservation calendar and the updated merchant system reservation calendar to the bidding module 137 so that the bidding module 137 may determine a bid for an advertising space auction.

In an example embodiment, the bidding module 137 determines bids on behalf of the merchant system 120 for an advertising space auction with the advertising platform 140. In an example embodiment, the bidding module 137 receives availability information from the availability module 135. In an example embodiment, the bidding module 137 receives bidding preferences from the merchant system 120. For example, the bidding module 137 receives an allotment of funds to use for advertising purposes, bidding parameters, and marketing information from the merchant system 120 via the network 150. In an example embodiment, the bidding module 137 receives notice of an advertising space auction from the advertising platform 140 via the network 150. In an example embodiment, based on the availability information, the bidding parameters, and the marketing information, the bidding module 137 determines an initial bid for an advertising space auction. In an example embodiment, the bidding module 137 transmits the initial bid to the advertising platform 140. In an example embodiment, at a time after transmitting the initial bid for the advertising space auction to the advertising platform 140, the bidding module 137 receives a notification of the progress of the advertising space auction from the advertising platform 140. In an example embodiment, if the auction is complete, the bidding module 137 transmits a notification to the merchant system 120.

In another example embodiment, if the auction is not complete, the bidding module 137 receives updated availability information from the merchant system via the availability module 135. In this example embodiment, the availability module 135 receives an updated merchant reservation calendar via the network 150 from the merchant system 120 and determines the updated merchant system 120 availability. In an example embodiment, the bidding module determines a new bid for the advertising space auction based on the updated availability information, the bidding parameters, and the marketing information. In an example embodiment, the new bid is the same value as the initial bid. In this example embodiment, the bidding module 137 waits to receive another notification of the progress of the advertising space auction.

In another example embodiment, the new bid is different from the initial bid. In this example embodiment, the bidding module 137 transmits the new bid to the advertising platform 140 over the network 150. In an example embodiment, the bidding module 137 receives a notification of the progress of the advertising space auction from the advertising platform 140. In an example embodiment, if the auction is complete, the bidding module 137 transmits a notification of completion of the auction to the merchant system 120 via the network 150. In an example embodiment, if the auction is not complete, the bidding module 137 continues to repeat the bidding process until receiving a notification from the advertising platform that the advertising space auction is complete. In an example embodiment, when the bidding module 137 determines that the advertising space auction is complete, the bidding module 137 transmits a notification to the merchant system 120 that the auction is complete via the network 150.

An example advertising platform 140 conducts the sale of one or more advertising spaces via advertising space auctions. In an example advertising space auction, one or more competing advertising systems 130 and/or merchant systems 120 may make bids for the advertising space associated with the advertising space auction. In an example advertising space auction, the advertising platform 140 receives an initial bid for the auction from the advertising system 130 on behalf of the merchant system 120 via the network 150. In this example embodiment, the advertising system 130 also receives initial bids from other advertising systems 130 and/or merchant systems 120. The advertising platform 140, in this example embodiment, may transmit notifications of progress of the auction to the parties from whom it received bids, including the advertising system 130. In this example embodiment, if a threshold amount of time passes and the advertising platform 140 receives no subsequent bids from any advertising systems 130 and/or merchant systems 120, the advertising platform 140 determines that the advertising system 130 and/or merchant system 120 that submitted the highest initial bid is the winner of the advertising space auction. In this example embodiment, the advertising platform transmits a notification of a completed auction to the advertising systems 130 and/or merchant systems 120 from whom it received initial bids via the network 150.

In another example embodiment, the advertising platform receives subsequent bids from one or more advertising systems 130 and/or merchant systems 120, including the advertising system 130, via the network 150. In an example embodiment, the advertising platform 140 continues to receive subsequent bids from one or more advertising systems 130 and/or merchant systems 130 until the advertising platform 140 receives no new subsequent bids for a threshold amount of time. In this example embodiment, the advertising platform 140 may continue to transmit notifications of the progress of the auction from the parties from whom it received initial bids and/or subsequent bids. In an example embodiment, after the threshold amount of time passes, the advertising platform 140 determines that the advertising system 130 and/or merchant system 130 that submitted the last bid is the winner of the advertising space auction. In an example embodiment, the advertising platform 140 transmits a notice of completed auction to all advertising systems 130 and/or merchant systems 130 that submitted subsequent bids, including the advertising system 130, via the network 150. In an example embodiment, if the advertising system 130 won the auction, the advertising platform 140 displays the advertisement of the merchant system 120 according to the description of the advertising space in the advertising space auction.

It will be appreciated that the network connections shown are example and other means of establishing a communications link between the computers and devices can be used. Moreover, those having ordinary skill in the art having the benefit of the present disclosure will appreciate that the user computing device 110, the merchant system 120, the advertising system 130, and the advertising platform 140 illustrated in FIG. 1 can have any of several other suitable computer system configurations. For example, a user computing device 110 embodied as a mobile phone or handheld computer may or may not include all the components described above.

Figure 7:
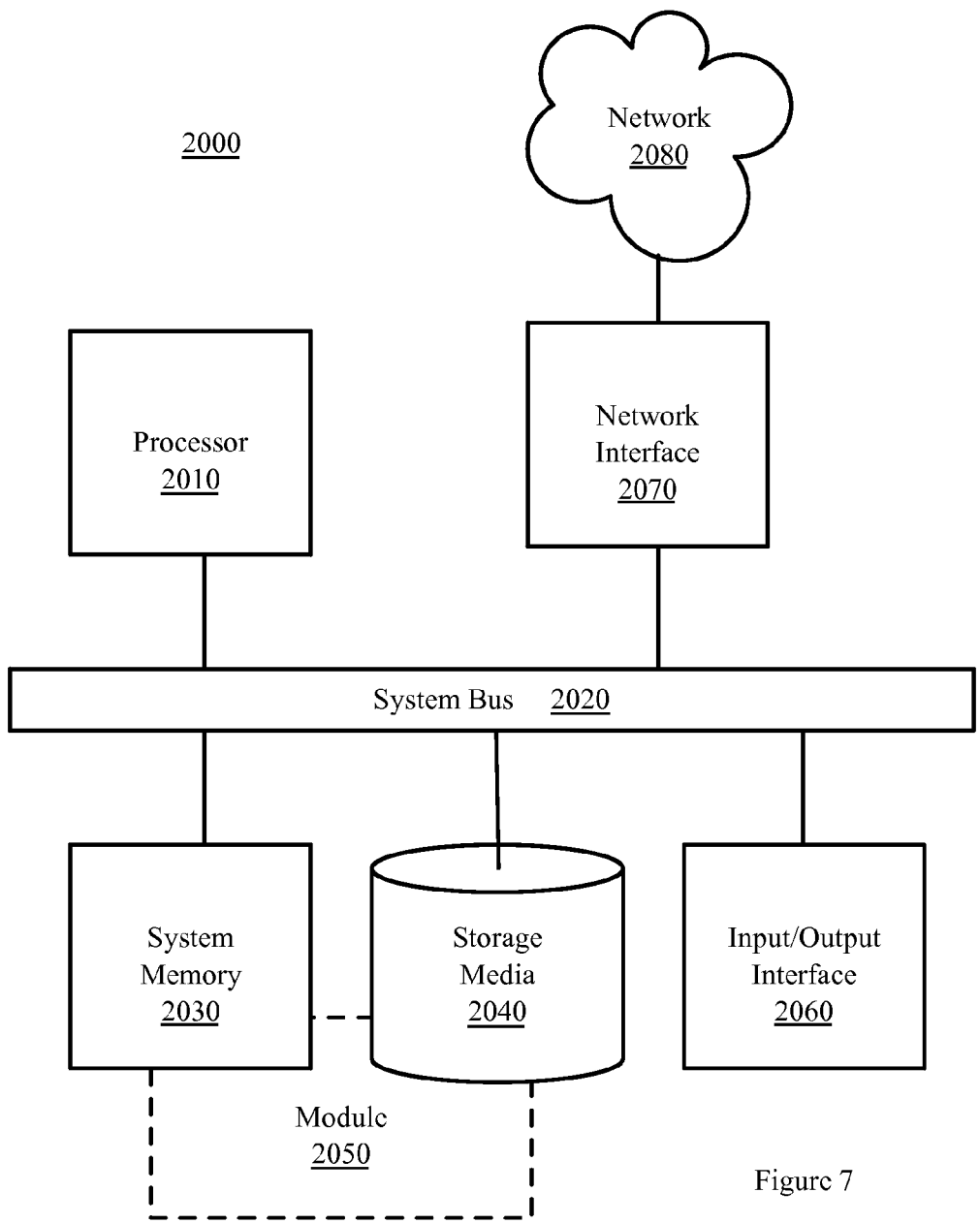
FIG. 7 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 7. Furthermore, any modules associated with any of these computing machines, such as modules described herein or any other modules (scripts, web content, software, firmware, or hardware) associated with the technology presented herein may by any of the modules discussed in more detail with respect to FIG. 7. The computing machines discussed herein may communicate with one another as well as other computer machines or communication systems over one or more networks, such as network 150. The network 150 may include any type of data or communications network, including any of the network technology discussed with respect to FIG. 7.

Example Processes

The example methods illustrated in FIGS. 2-6 are described hereinafter with respect to the components of the example operating environment 100. The example methods of FIGS. 2-6 may also be performed with other systems and in other environments.

Figure 2:
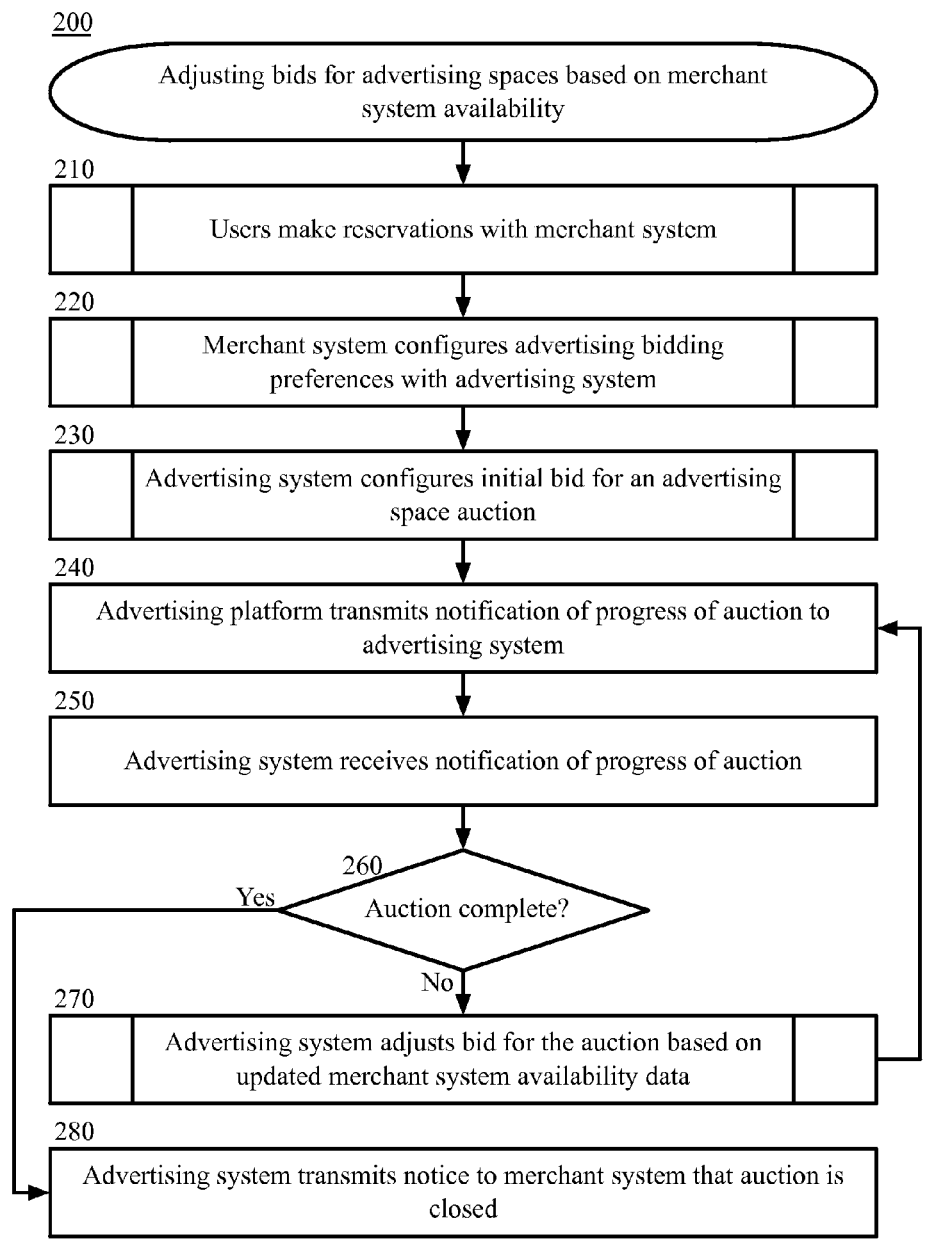
FIG. 2 is a block flow diagram depicting a method for adjusting bids for advertising spaces based on merchant system availability, in accordance with certain example embodiments.

FIG. 2 is a block diagram depicting a method 200 for bidding and adjusting bids for advertising spaces based on merchant system availability, in accordance with certain example embodiments. The method 200 is described with reference to the components illustrated in FIG. 1.

In block 210, users 101 make reservations with a merchant system 120. The method for making a reservation with a merchant system 120 is described in more detail hereinafter with reference to the method described in FIG. 3.

Figure 3:
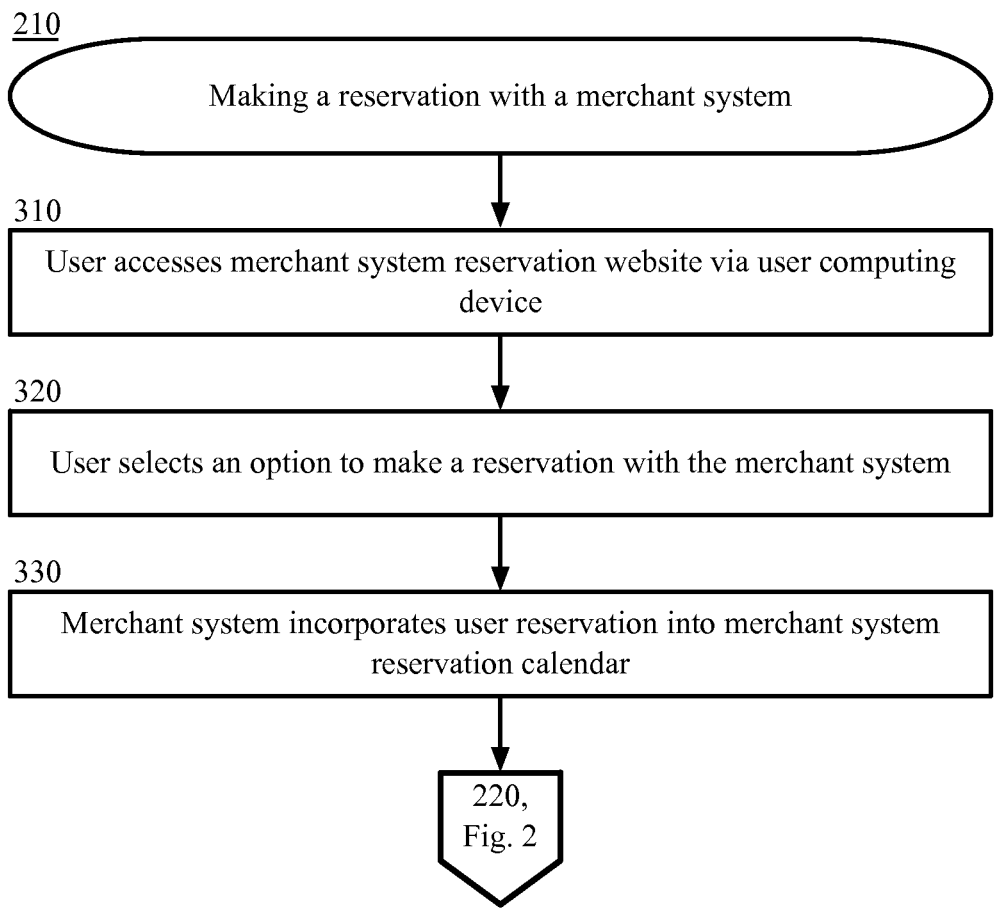
FIG. 3 is a block flow diagram depicting a method for making a reservation with a merchant system, in accordance with certain example embodiments.

FIG. 3 is a block diagram depicting a method 210 for making a reservation with a merchant system 120, in accordance with certain example embodiments. The method 210 is described with reference to the components illustrated in FIG. 1.

In the example embodiments described herein, the merchant system 120 utilizes a merchant system website 127 that users 101 may access to make reservations for services or products of the merchant system 120. In the example embodiments described herein, the merchant system 120 uses the interaction of users 101 with the merchant system reservation website 127 to populate and/or produce a merchant system 120 reservation calendar. In an example embodiment, users 101 may make reservations, change reservations, and/or cancel reservations using the reservation website 127. For example, in changing a reservation the user 101 may change the date of the reservation, change the service or product associated with the reservation, or change other details associated with the reservation. In other example embodiments, the merchant system 120 utilizes another means in addition to or instead of the reservation website 127 to keep track of user 101 reservations and produce a reservation calendar. For example, one or more agents of the merchant system 120 may manually enter user 101 reservations into a merchant system 120 reservation calendar. The method 210 describes an example user 101 interaction with the merchant system reservation website 127.

In block 310, a user 101 accesses a merchant system reservation website 127 via a user computing device 110. In an example embodiment, the merchant system website 127 provides an interface wherein the user 101 can make, change, or cancel reservations for goods and services provided by the merchant system 120. In the example embodiments described herein, a "reservation" may refer to a reservation, an order, a booking, a requisition, a commission, a purchase, or any other term that the merchant system 120 may use to describe a setting apart a good or a service for performance or delivery to the user 101 at a time after the reservation is made. In an example embodiment, a reservation may comprise a transaction such as purchase of a good or service for later delivery or performance by the merchant system 120 to the user 101. In another example embodiment, the reservation (the setting apart of the good or service) precedes the transaction. For example, the transaction between the user and the merchant system 120 takes place at the time of performance or delivery.

In an example embodiment, the user 101 enters the merchant system reservation website 127 address into the web browser 115 or otherwise accesses the merchant system reservation website 127 via the web browser 115. In an example, the user 101 actuates a user interface 111 object for a merchant system 120 advertisement on the web browser 115 and the web browser 115 redirects to the reservation website 127. In another example embodiment, the user 101 accesses the merchant system reservation website 127 via a merchant application 113 resident on the user computing device 110 that communicates with the merchant system 120 over the network 160. For example, the user 101 downloads the merchant application 113 from the merchant system 120.

In block 320, the user 101 selects an option to make a reservation with the merchant system 120. In an example embodiment, the user 101 selects a date and/or time associated with the performance or delivery of service or product of the merchant system 120. For example, the user 101 selects a date and time for a flight, for a catering service, for a doctor's appointment, for a dinner reservation, or for a movie with a relevant merchant system 120 providing the service. In an example embodiment, the user 101 actuates one or more objects on the user interface 111 of the user computing device 110 to communicate to the merchant system 120 reservation website 127 a selection of an option to make a reservation with the merchant system 120. For example, after selecting a date and time for the reservation, the user 101 actuates an object that reads "make reservation" on the reservation website 127 via the user interface 111 of the user computing device 110.

In block 330, the merchant system 120 incorporates the user 101 reservation into the merchant system 120 reservation calendar. In an example embodiment, the merchant system 120 receives the user 101 reservation via a user 101 interaction with the reservation website 127. In another example embodiment, the merchant system 120 receives the user 101 reservation by other means and an agent of the merchant system 120 incorporates the user 101 reservation into the reservation calendar. For example, an agent of the merchant system 120 receives a user 101 reservation via telephone, email, text message, or word of mouth, and enters the user 101 reservation into the reservation calendar via a merchant system computing device 121. In the example embodiments described herein, the reservation calendar is electronically accessible by the advertising system 130 over the network 150 and/or the merchant system 120 is able to electronically submit the reservation calendar to the advertising system 130 via the network 150. In an example embodiment, the reservation calendar is a program that executes on the server 125 and/or the reservation website 127.

From block 330, the method 210 proceeds to block 220 of FIG. 2.

Returning to FIG. 2, in block 220, the merchant system 120 configures advertising bidding preferences with the advertising system 130. The method for configuring bidding preferences with an advertising system 130 is described in more detail hereinafter with reference to the method 220 described in FIG. 4.

Figure 4:
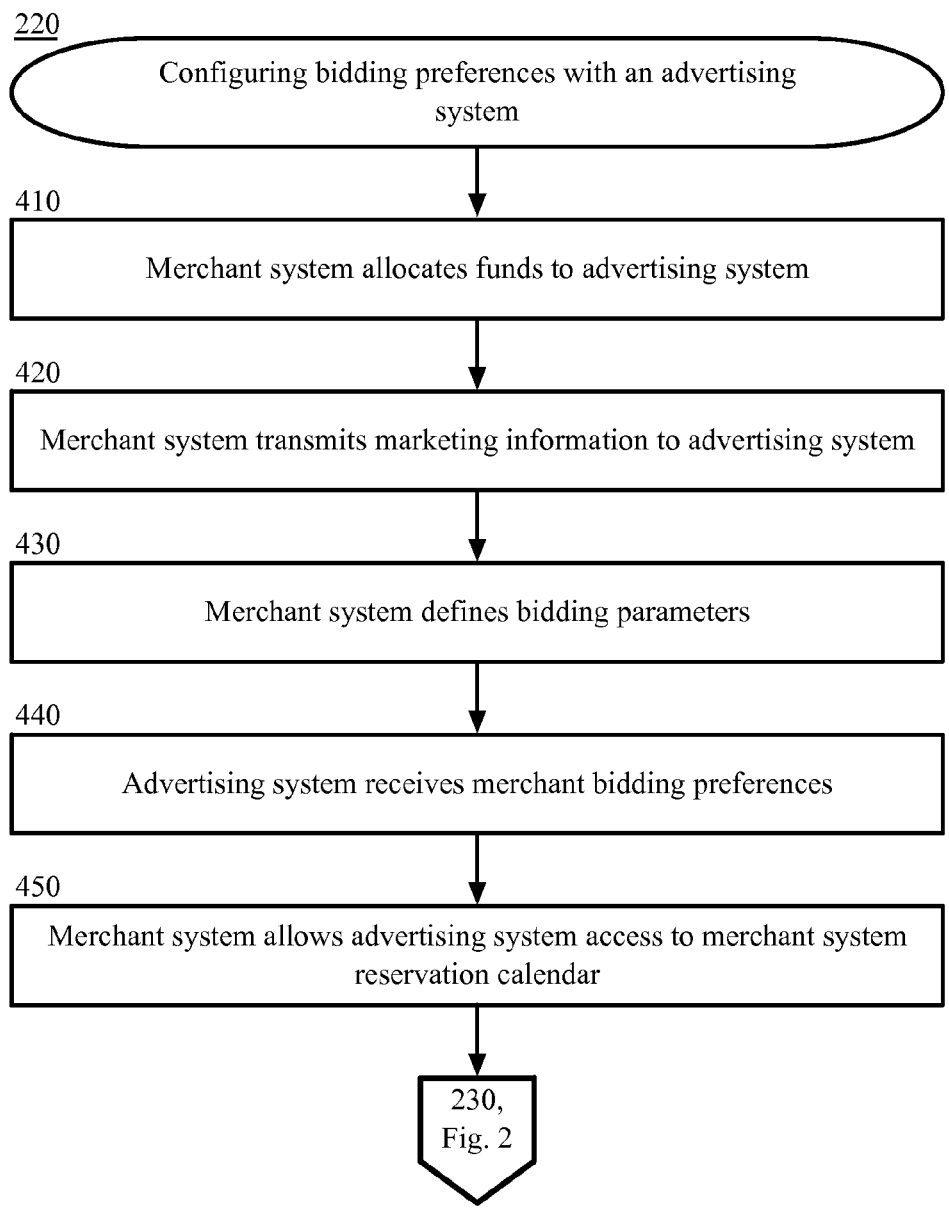
FIG. 4 is a block flow diagram depicting a method for configuring bidding preferences with an advertising system, in accordance with certain example embodiments.

FIG. 4 is a block diagram depicting a method 220 for configuring bidding preferences with an advertising system 130, in accordance with certain example embodiments. The method 220 is described with reference to the components illustrated in FIG. 1.

In the example embodiments described herein, the merchant system 120 transmits bidding preferences to the advertising system 130 comprising an allocation of funds to the advertising system 130, marketing information, and bidding parameters. In the example embodiments described herein, the advertising system 130 makes bids, based on the bidding preferences, on behalf of the merchant system 120 for advertising space auctions with an advertising platform 140. An example advertising space auction comprises an auction for an advertising space with an advertising platform 140, such as a website, radio station, television program, newspaper, magazine, or user computing device 110 application. In an example advertising space auction, one or more advertising systems 130 make bids to the advertising platform 140 on behalf of merchant systems 120 for the advertising space.

In block 410, the merchant system 120 allocates funds to the advertising system 130. In an example embodiment, the merchant system 120 transmits an allocation of funds to the advertising system 130 for a certain amount of time. For example, the merchant system 120 allocates five thousand dollars to the advertising system 130 for one month for advertising purposes. In an example embodiment, the advertising system 130 may spend up to the allocated amount for advertising space auctions with one or more advertising platforms 140. In another example embodiment, the advertising system 130 may spend up to the allocated amount in one advertising space auction with an advertising platform 140.

In block 420, the merchant system 120 transmits marketing information to the advertising system 130. In an example embodiment, marketing information comprises an average length of time before performance or delivery by the merchant system 120 that a user 101 makes a reservation with the merchant system 120. In the example embodiments described herein, the phrase "ahead of time" refers to the length of time before performance of service or delivery of product by the merchant system 120. In an example embodiment, the marketing data may reveal that users 101 make a reservation for a service or product merchant system 120 an average of two weeks ahead of time. For example, the average user 101 may purchase a ticket for a flight an average of one week ahead of the actual day of the flight. In an example embodiment, the marketing data may provide statistical data in addition to or instead of the average length of time before performance or delivery that users 101 make reservations to the merchant system 120. For example, the statistical data may statistically stratify users 101 into categories or comprise a histogram. For example, the marketing statistical data shows that 25% of users 101 purchase a ticket more than two months ahead of time, 30% of users 101 purchase a ticket between two months and two weeks ahead of time, 25% of users 101 purchase a ticket between two weeks and two days ahead of time, and 20% of users 101 purchase a ticket two days ahead of time or later. In the example embodiments described herein, marketing data assists the advertising system 130 in determining an appropriate bid for an advertising space auction.

In block 430, the merchant system 130 defines bidding parameters. In an example embodiment, the bidding parameters comprise a minimum threshold bid and a maximum threshold bid for an advertising space auction. For example, the minimum threshold bid comprises the minimum bid that the advertising system 130 can make for an advertising space auction and the maximum threshold bid comprises the maximum bid that the advertising system 130 can make for the advertising space auction. In this example, the minimum and maximum threshold bids may vary depending on the type of advertising space for which the advertising system 130 is bidding. For example, the minimum threshold bid for a radio time slot may be higher than for an advertising space on a website. In an example embodiment, the bidding parameters may comprise a threshold change in merchant system 120 availability required for an increase or decrease in the bid of a certain amount. For example, the bidding parameters state that for every increase of merchant availability of five percent, the advertising system 130 should decrease the bid in the advertising space auction by ten dollars. In the example embodiments described herein, the advertising system 130 determines merchant system 120 availability based on a merchant system 120 reservation calendar.

In block 440, the advertising system 130 receives merchant system 120 bidding preferences. In an example embodiment, the advertising system 130 receives one or more of an allocation of funds, marketing information, and bidding parameters over the network 150 as described herein. In another example embodiment, the advertising system 130 further receives other bidding preferences from the merchant system 120 that the advertising system 130 may take into account when determining bids for an advertising space auction. For example, the merchant system 120 may specify an advertising strategy or a preference or ranking for certain types of advertising spaces.

In block 450, the merchant system 120 allows the advertising system 130 access to the merchant system 120 reservation calendar. In the example embodiments described herein, the reservation calendar is electronically accessible by the advertising system 130 over the network 150. In other example embodiments, the merchant system 120 periodically, continuously, or in response to receiving a request from the advertising system 120, transmits the reservation calendar to the advertising system 130 via the network 150.

From block 450, the method 220 proceeds to block 230, in FIG. 2.

Returning to FIG. 2, in block 230, the advertising system 130 configures an initial bid for an advertising space auction. The method for determining an initial bid for an advertising space auction is described in more detail hereinafter with reference to the method 330 described in FIG. 5.

Figure 5:
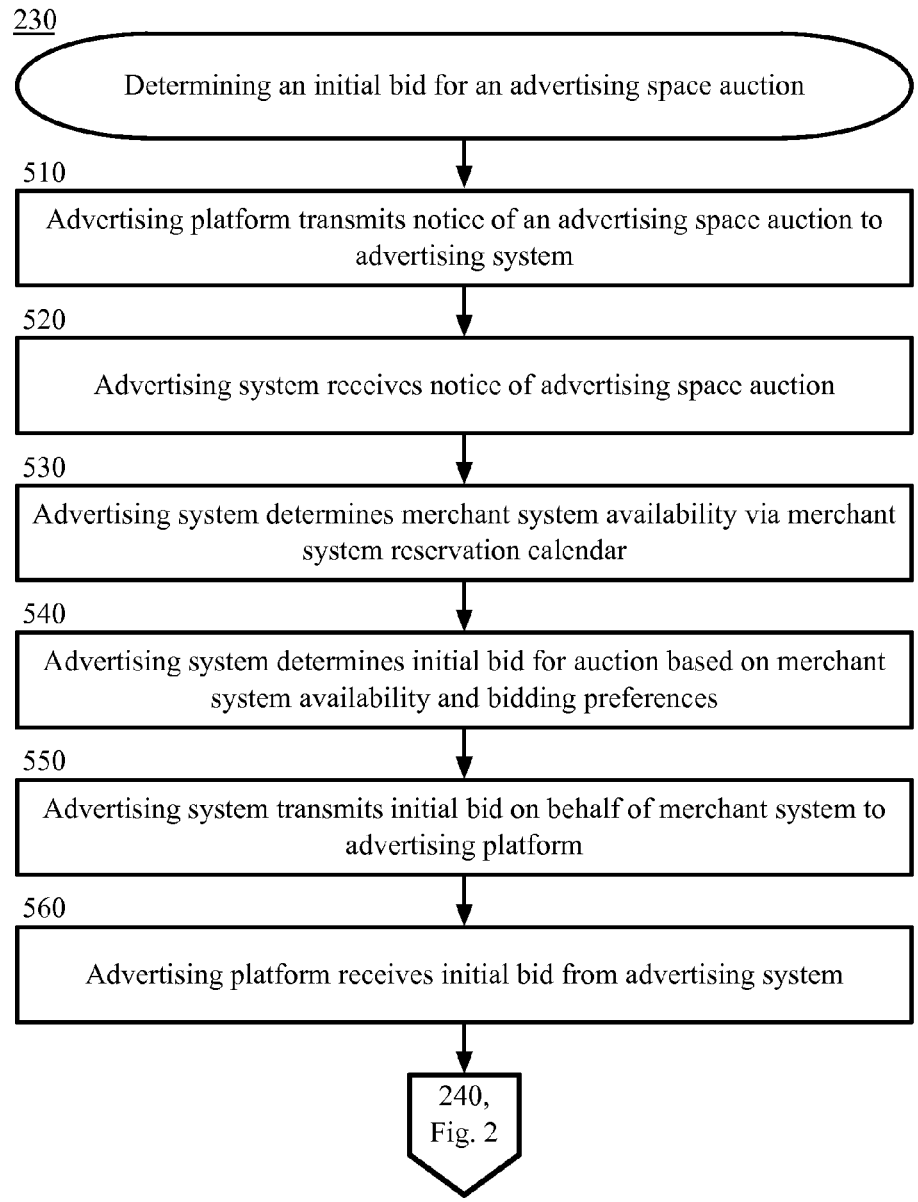
FIG. 5 is a block flow diagram depicting a method for determining an initial bid for an advertising space auction, in accordance with certain example embodiments.

FIG. 5 is a block diagram depicting a method 230 for determining an initial bid for an advertising space auction, in accordance with certain example embodiments. The method 230 is described with reference to the components illustrated in FIG. 1.

In block 510, an advertising platform 140 transmits a notice of an advertising space auction to the advertising system 130. For example, the advertising platform 140 transmits a notice of an auction for a website advertisement to the advertising system 130 via the network 150. In an example embodiment, the notice of the advertising space auction comprises details associated with the auction. For example, the notice comprises an opening time and a closing time for the auction, a description of the advertising space associated with the auction, a minimum opening bid for the auction, an advertising space auction identifier, and any other relevant or useful information. In an example embodiment, the advertising transmits an advertising space auction identifier along with the initial bid so that the advertising system 140 can associate the initial bid with the appropriate advertising space auction. The description of the advertising space may comprise details concerning the location of the advertisement, the time of the advertisement, and/or the duration of the advertisement. For example, the description of the advertising space reads "two minute segment for FM radio station 98.4, Mar. 23, 2015, 06:00-06:02 GMT." An example advertising space identifier is used by the advertising space platform 140 to identify the advertising space auction. In this example, the advertising system 130 submits bids for the advertising space auction along with the advertising space auction identifier so that the advertising platform 140 can associate the bids with the appropriate auction.

In an example, the advertising space auction is provided by a search system advertising platform 140 for a prioritization of the merchant system 120 in search results. In this example, if a Japanese restaurant merchant system 120 wins the auction, the search system advertising platform 140 will prioritize the merchant system 120 in search results to users 101 in a physical proximity to a merchant system 120 location. In this example, a user 101 in a physical proximity to a location of the merchant system 120 searching for "Japanese food" will be more likely to retrieve information associated with the merchant system 120 than if the merchant system 120 does not win the advertising space auction.

In another example, the advertising space auction is provided by a website advertising platform 140, a radio advertising platform 140, a television advertising platform 140, a newspaper advertising platform 140, a web application advertising platform 140, an advertising platform 140 associated with the advertising system 130, or any other advertising platform 140. For example, an advertising space auction provided by a website advertising platform is for a pop-up advertisement on a certain website for a certain date. In another example embodiment, the advertising space auction provided by a radio advertising platform 140 is for a two minute segment before a prime time radio program on a certain date.

In block 520, the advertising system 130 receives the notice of the advertising space auction. In an example embodiment, the advertising system 130 receives multiple notices associated with multiple corresponding advertising space auctions from one or more advertising platforms 140.

In block 530, the advertising system 130 determines merchant system 120 availability via the merchant system 120 reservation calendar. In an example embodiment, the merchant system 120 reservation calendar comprises a total capacity for the services or delivery of products associated with the merchant system 120 as well as reservations associated with users 101 for certain periods of time, for times associated with performance of services, or for shipments associated with certain delivery times. For example, the reservation calendar is a reservation calendar or a shipment calendar. For example, an example restaurant merchant system 120 serves up to 100 customers per hour. In this example, the reservation calendar for the restaurant merchant system 120 may divided into one hour sections. In an example embodiment, the reservation calendar may comprise a total number of reservations listed for each time period on the calendar and the total availability for each time period on the calendar. For example, for 5:00-6:00 p.m. on March 3, the restaurant merchant system 120 reservation calendar lists a capacity of 100 customers, 40 confirmed reservations, and an availability of 60. In an example embodiment, the merchant system 120 may comprise the availability listed as a percentage. For example, the restaurant merchant system 120 reservation calendar lists the availability as 60% for the 5:00-6:00 p.m. time period on March 3. In an example embodiment, the merchant system 120 reservation calendar may comprise other statistics such as a capacity and a percentage of capacity that has been reserved already. For example, the restaurant merchant system 120 reservation calendar lists the capacity as 100 customers and the percentage reserved as 40%.

In other example embodiments, the merchant system 120 reservation calendar provides only raw reservation data and the advertising system 130 calculates availability and any other useful or relevant statistics based on the raw data. In this example embodiment, the raw data associated with the reservation calendar may comprise a total capacity for the services or delivery of products associated with the merchant system 120 as well as reservations associated with users 101 for certain periods of time, for times associated with performance of services, or for shipments associated with certain delivery times. For example, a theatrical performance of a merchant system 120 at a 5:00 p.m. performance time on March 5 has a capacity of 1,500 viewers and 500 tickets have been purchased. In this example, the reservation calendar lists the capacity as 1,500 and lists 500 reservations associated with the 5:00 p.m., March 5 performance.

In an example embodiment, the merchant system 120 updates the reservation calendar each time a new reservation is made or an existing reservation is cancelled, withdrawn, or changed. For example, the reservation calendar may be automatically updated each time a customer user 101 of the merchant system 120 interacts with the merchant system website 127 to make a new reservation or to cancel or modify an existing reservation. In another example embodiment, the merchant system 120 periodically updates the reservation calendar to reflect new, cancelled, withdrawn, or changed reservations. For example, the merchant system 120 updates the reservation calendar every 30 seconds.

In block 540, the advertising system 130 determines an initial bid for the auction based on merchant system 120 availability and bidding preferences. In an example embodiment, the merchant system 120 bidding preferences comprise an allocation of funds to the advertising system 130, marketing information, and bidding parameters.

In an example embodiment, the advertising system 130 determines availability based on the merchant system 120 reservation calendar. For example, the merchant system 120 reservation calendar comprises availability data. In an example embodiment, the advertising system 130 determines availability data from raw data in the reservation calendar. In an example embodiment, the reservation calendar comprises a data record for each day the merchant system 120 operates. In an example, the data record for each day may be subdivided into periods of time, for example, 24 one-hour intervals or 96 fifteen-minute intervals. For example, each period of time in the reservation calendar may comprise a capacity to provide services, products, or deliveries as well as confirmed reservations for those services, products, or deliveries. For example, the capacity is the maximum amount of services that the merchant may provide during the time period. For example, if a restaurant can seat fifty people in a one hour time period, then the capacity of the restaurant is fifty. In an example embodiment, the merchant system 120 determines availability for each time period in the merchant system 120 reservation calendar by subtracting the corresponding number of reservations from the corresponding capacity listed under the time period. For example, if a restaurant has a capacity to seat fifty people between 2:00-3:00 p.m. and there are 30 reservations, the availability for the time period is 20. In an example embodiment, the advertising system 130 determines availability as a proportion by dividing the availability by the capacity. For example, if the capacity is 1000 seats at a theatre and the availability is 200 seats, then the availability as a proportion is 200/1000 (0.2).

In another example embodiment, the merchant system 120 reservation calendar comprises, for each time period for which the merchant system 120 provides services, a certain number of empty fields equal to the capacity of the merchant system 120. In this example embodiment, when a user confirms a reservation via the merchant system 120 reservation website for a time period or when an agent associated with the merchant system 120 manually adds a reservation to the time period, one of the empty fields is marked as reserved. In this example embodiment, the advertising system 130 determines the availability for the time period by determining the number of remaining empty fields. In another example embodiment, the advertising system 130 divides the number of empty fields by the total number of fields to determine an availability proportion.

In an example embodiment, the advertising system 130 determines the initial bid based at least in part on bidding parameters and the availability. Example bidding parameters comprise a low bidding threshold, a high bidding threshold, and acceptable bidding intervals according to availability. For example, in the bidding parameters, the merchant system 120 may define $1.00 as a low bidding threshold for a 24 hour advertising space on a website and $100.00 as the high bidding threshold. In this example, the merchant system may define $1.00 as an acceptable bid when the merchant is at 100% availability and $100.00 as an acceptable bid when the merchant system is at 0% availability. In this example, the merchant system may instruct the advertising system to increase the bid for the advertising space by $1.00 or for each decrease in availability of 1% and decrease the bid for the advertising space by $1.00 for each increase in the availability of 1%. For example, if the current bid was $40.00 and the availability decreased by 5%, the bidding parameters would instruct the advertising system 130 to increase the bid by $5.00 to $45.00. In another example embodiment, the bidding parameters may instruct the advertising system to further increase or decrease the bid for the advertising space based on the transmitted marketing preferences. For example, if the marketing information shows that most customers wait until a few days ahead of time to make a reservation or purchase a service from a merchant system, the merchant system may instruct the advertising system to make low bids when the advertising time slot is two weeks ahead of time, even if the availability is low. Alternatively, if the marketing data shows that few customers wait until a few days ahead of time to make a reservation or purchase a service from a merchant system, the merchant system may instruct the advertising system to make high bids when the advertising time slot is two weeks ahead of time, even if the availability is high. The bid amounts based on the bidding preferences, including an allocation of funds to the advertising system 130, marketing information, and bidding parameters, can be configured by the advertising system operator or the merchant system operator to achieve a desired increase/decrease of bid amount based on, for example, availability and time to service availability.

The advertising system receives the merchant system bidding preferences. In an example embodiment, the merchant system bidding preferences comprise the allocated funds, the marketing information, and the bidding parameters.

In an example embodiment, the advertising system 130 determines the initial bid based at least in part, in addition to the availability and bidding parameters, on the marketing data. In an example embodiment, the merchant system transmits statistics concerning the merchant system or the industry associated with the merchant system 120. In an example embodiment, marketing information comprises an average or median length of time before performance or delivery by the merchant system 120 that a user 101 makes a reservation with the merchant system 120. For example, the average customer makes a reservation four days ahead of the performance of a service by the merchant system 120 or the delivery of a product. In an example embodiment, the merchant system 120 transmits marketing data comprising statistics that show that 25% of customers reserve a service between a month ahead of performance and two weeks ahead of performance, 50% of customers reserve a service within two weeks ahead of performance and two days ahead of performance, and 25% of customers reserve a service within two days ahead of performance and the time of performance of service.

In an example embodiment, the advertising system 130 determines a higher initial bid when the marketing data show that advertising will be more effective and determines a lower initial bid when the marketing data show that advertising will be less effective. For example, the marketing data show that 25% of customers reserve a service between a month ahead of performance and two weeks ahead of performance, 50% of customers reserve a service within two weeks ahead of performance and two days ahead of performance, and 25% of customers reserve a service within two days ahead of performance and the time of performance of service. In this example, the advertising system 130 makes a lower bid for an advertising space that is three weeks ahead of performance, in which up to 25% of customers are likely to reserve the service, than it would make for the same or a similar advertising space between two weeks ahead of performance and two days ahead of performance, in which 50% of customers are likely to reserve the service. In an example embodiment, the degree to which the marketing data affect the determination of a bid by the advertising system 130 is configurable by the merchant system 120 and/or advertising system 130.

In block 550, the advertising system 130 transmits the initial bid on behalf of the merchant system 120 to the advertising platform 140. In an example embodiment, the advertising system 130 transmits the initial bid via the network 150.

In block 560, the advertising platform 140 receives the initial bid from the advertising system 130. In an example embodiment, the advertising platform 140 receives one or more additional bids from one or more other advertising systems 130 and/or merchant systems 120 for the same advertising space auction.

From block 560, the method 230 proceeds to block 240, in FIG. 2.

Returning to FIG. 2, in block 240, the advertising platform 140 transmits notification of progress of the auction to the advertising system 130. In an example embodiment, the notification of progress of the auction comprises a notification that the auction is still in progress. In another example embodiment, the notification comprises a notification that the auction is finished and that the merchant system 120 won the auction. In yet another example embodiment, the notification comprises a notification that the auction is finished and that the merchant system 120 did not win the auction. In an example embodiment, the advertising platform 140 transmits the notification of progress of the auction to the advertising system 130 via the network 150.

In block 250, the advertising system 130 receives the notification of progress of the auction. For example, the advertising system 130 receives the notification of progress of the auction via the network 150.

In block 260, the advertising system 130 determines if the auction is complete based on the received notification of progress. In an example embodiment, the notification of the progress of the auction comprises an indication as to whether the auction is complete or not.

If the auction is complete, the method 200 proceeds to block 280. For example, the advertising system 130 receives, from the advertising platform 140, a notification of progress of the auction that informs the advertising system 130 that the auction is complete.

In block 280, the advertising system 130 transmits a notice to the merchant system 120. In an example embodiment, the notice informs the merchant system 120 either that the merchant system 120 has won the auction or that the merchant system 120 has not won the auction.

Returning to block 260, if the auction is not complete, the method 200 proceeds to block 270.

In block 270, the advertising system 130 adjusts the bid for the auction based on updated merchant system 120 availability data. The method for adjusting a bid for an advertising space auction based on merchant system 120 availability is described in more detail hereinafter with reference to the method 270 described in FIG. 6.

Figure 6:
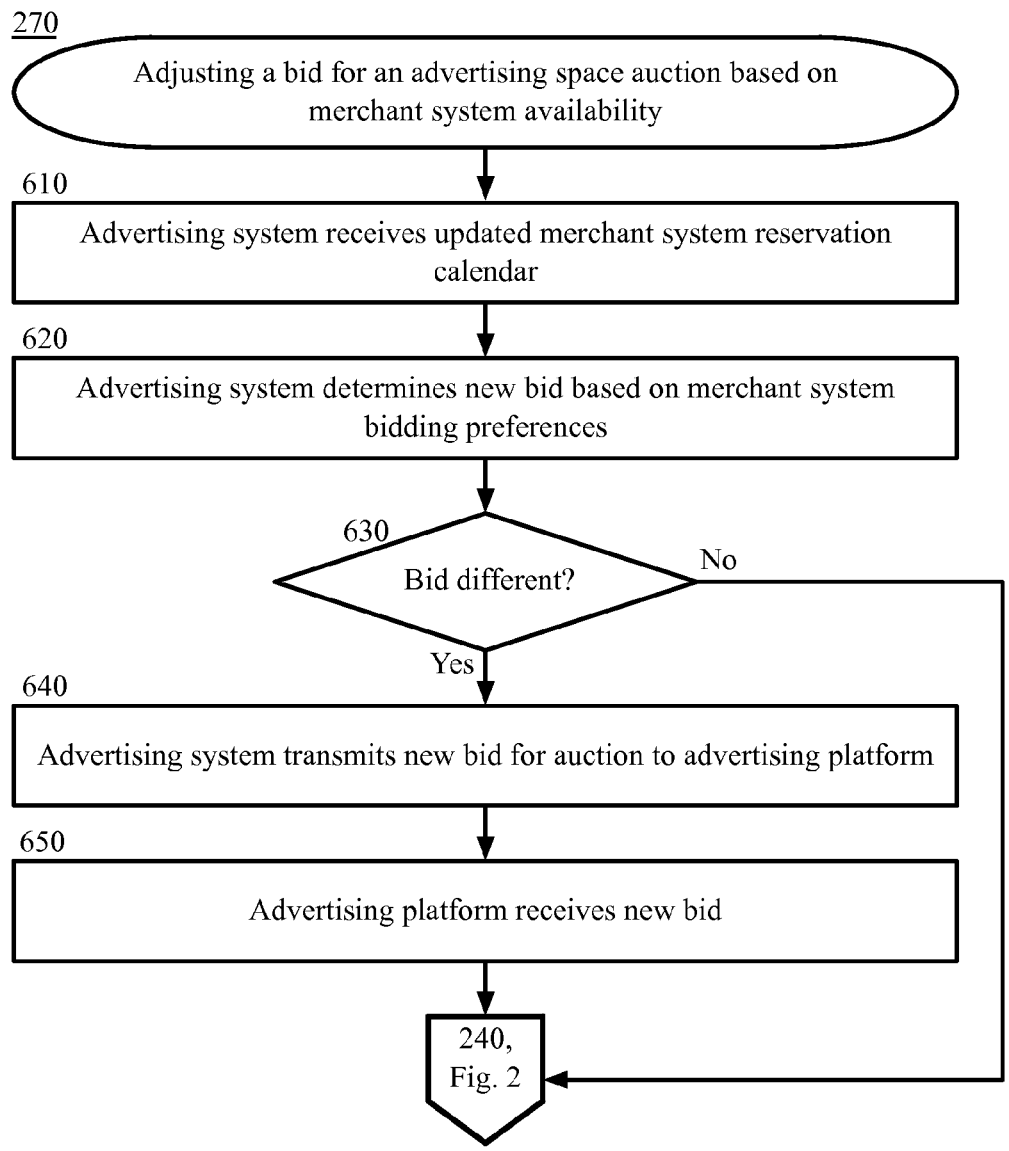
FIG. 6 is a block flow diagram depicting a method for adjusting a bid for an advertising space auction based on merchant system availability, in accordance with certain example embodiments.

FIG. 6 is a block diagram depicting a method 270 for adjusting a bid for an advertising space auction based on merchant system 120 availability, in accordance with certain example embodiments. The method 270 is described with reference to the components illustrated in FIG. 1.

In block 610, the advertising system 130 receives an updated merchant system 120 reservation calendar. In an example embodiment, the availability of the merchant system 120 changes at a time after the advertising system 130 receives or accesses the first merchant system 120 reservation calendar. For example, at the time the advertising system 130 receives a first merchant system 120 reservation calendar from a restaurant merchant system 120 having a capacity of 100 tables, the restaurant has an availability of 30% (30 tables available out of 100) between 5:00 p.m. and 6:00 p.m. for a certain date. In this example, at a time after the advertising system 130 receives the first reservation calendar, customers reserve five more tables (5% of capacity) for the same date for the period between 5:00 p.m. and 6:00 p.m., decreasing the availability from 30% to 25%. In another example embodiment, the availability of the merchant system 120 does not change from the time the advertising system 130 receives the first reservation calendar until the time the advertising system 130 receives the updated merchant system 120 reservation calendar. For example, no new reservations are made and no reservations are withdrawn or cancelled. In another example, the same number of reservations are cancelled as the number of reservations that are added during this time period between the first and updated reservation calendars.

In block 620, the advertising system 130 determines a new bid based on the merchant system 120 bidding preferences. In an example embodiment, the advertising system 130 uses the same criteria to determine the new bid as it used to determine the initial bid. For example, the advertising system 130 determines the new bid based at least in part on bidding parameters, the availability based on the updated reservation calendar, and the marketing information.

In block 630, the advertising system 130 determines whether the determined new bid is different from the initial bid. In an example embodiment, the new bid is the same amount as the initial bid. In another example embodiment, the new bid is higher or lower than the initial bid. In an example embodiment, the advertising system 130 determines a higher new bid than initial bid if the availability increases relative to the availability associated with the first merchant system 120 reservation calendar. In this example embodiment, the advertising system 130 determines a lower new bid than initial bid if the availability decreases relative to the availability associated with the first merchant system 120 reservation calendar. In another example embodiment, the advertising system 130 determines a higher or lower bid based on the marketing information. For example, if the marketing information shows that the percentage of customers that reserve a service increases as the day of performance approaches, the advertising system 130 determines a higher value for the new bid than it did for the initial bid. Likewise, in this example, if the marketing information shows that percentage of customers that reserve a service decreases as the day of performance approaches, the advertising system 130 determines a lower value for the new bid than it did for the initial bid.

If the new bid is not unchanged from the previous bid, the method 270 proceeds to block 240 in FIG. 2. In an example, the advertising system 130, based on the merchant system 120 reservation calendar, determines that the availability of the merchant system 120 increased since the time the advertising system 130 received the first reservation calendar. In this example, however, the marketing data show that as the day of performance of services of the merchant system 120 approaches, the percentage of users 101 that make reservations for the merchant system 120 service decreases. In this example, based on the combination of change in availability and based on the marketing data, the advertising system 130 determines that the new bid should be the same as the initial bid.

Returning to FIG. 2, in block 240, the advertising platform 140 transmits a notification of the progress of the auction to the merchant system 120. In this example embodiment, since the new bid is the same as the initial bid, the advertising system 130 does not need to submit a new bid and may maintain the initial bid. An example notification of the progress of the auction comprises a notice that the auction is still ongoing and a summary of the current state of the bidding in the advertising space auction. In another example, the example notification of the progress of the auction comprises a notice that the auction is finished and that the merchant system 120 won the advertising space auction. In yet another example, the example notification comprises a notice that the auction is finished and that the merchant system 120 did not win the advertising space auction. In yet another example embodiment, no notification of the process of the auction is transmitted if the merchant system 120 does not win the auction. In an example embodiment, the advertising platform 140 transmits the notification of the progress of the auction to the advertising system 130 via the network 150.

In an example embodiment, the advertising system 130 receives the notification of the progress of the advertising space auction. For example, the advertising system 130 receives the notification of the progress of the auction via the network 150.

In an example embodiment, if the auction is not complete, the method 270 is repeated. In this example embodiment, if the auction is complete, the advertising system transmits notice to the merchant system 120 that the auction is complete.

Returning to block 630, in FIG. 6, if the determined new bid is different from the initial bid, the method 270 proceeds to block 640.

In block 640, the advertising system 130 transmits the new bid for the auction to the advertising platform 140. In an example embodiment, the advertising system 130 transmits the new bid to the advertising platform via the same means advertising system 130 used to transmit the initial bid to the advertising platform 140. For example, the advertising system 130 transmits the new bid for the auction to the advertising platform 140 via the network 150. In an example embodiment, the advertising transmits an advertising space auction identifier along with the new bid so that the advertising system 140 can associate the new bid with the appropriate advertising space auction. In an example embodiment, the advertising system 130 transmits the new bid to the advertising platform 140 via the network 150. In an example embodiment, the advertising system 130 transmits the advertising space auction identifier, along with the new bid, to the advertising platform 140.

In block 650, the advertising platform 140 receives the new bid. For example, the advertising system 140 receives the new bid via the network 150. In an example embodiment, the advertising platform 140 receives the advertising space auction identifier along with the new bid, identifies the appropriate advertising space auction using the advertising space auction identifier, and associates the new bid with the advertising space auction.

From block 650, the method 270 proceeds to block 240, in FIG. 2.

Returning to FIG. 2, in block 240, the advertising platform 140 transmits notification of the progress of the auction to the advertising system 130.

In block 250, the advertising system 130 receives the notification of progress of the auction. For example, the advertising system 130 receives the notification of progress of the auction via the network 150.

In block 260, the advertising system 130 determines if the auction is complete. In an example embodiment, the notification of the progress of the auction comprises an indication as to whether the auction is complete or not.

If the advertising space auction is not complete, the method 200 proceeds to block 270. In an example embodiment, the method 270 and blocks 240 and 250 of method 200 repeat until the advertising system 130 receives a notification from the advertising platform 140 that the advertising space auction is complete. For example, the advertising system 130 may make more than one subsequent new bid to the advertising platform 140 on behalf of the merchant system 120 for the advertising space auction before receiving a notification from the advertising platform 140 that the auction is closed.

Returning to block 260, if the advertising space auction is complete, the method 200 proceeds to block 280.

In block 280, the advertising system 130 transmits a notice to the merchant system 120. In an example embodiment, the notice informs the merchant system 120 either that the merchant system 120 has won the auction or that the merchant system 120 has not won the auction.

Other Example Embodiments

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to adjust a bid in an electronic auction for an electronic advertisement space based on merchant system availability, comprising:
   receiving, by one or more computing devices associated with an advertising system, a first reservation calendar from a merchant computing system, the first reservation calendar comprising a first availability for a service of the merchant computing system for a predefined period of time;
   receiving, by the one or more computing devices and from the merchant computing system, statistical information, the statistical information indicating a statistical distribution of customers with respect to the length of time customers of the merchant computing system make a reservation prior to a time of performance of service associated with a reservation;

receiving, by the one or more computing devices and from the merchant system, bidding parameters, the bidding parameters comprising at least one of a minimum bid, a maximum bid, or a threshold change in availability;

determining, by the one or more computing devices and based on the first availability, the statistical information, and the bidding parameters, a first bid for an electronic auction for an electronic advertising space with an advertising platform system;

transmitting, by the one or more computing devices and to the advertising platform system, the first bid for the auction;

receiving, by the one or more computing devices and from the merchant computing system, a second reservation calendar comprising a second availability for the service of the merchant computing system for the predefined period of time, wherein the second availability is different from the first availability;

determining, by the one or more computing devices and based on the second availability, the statistical information, and the bidding parameters, a second bid for the auction, including:
  adjusting the first bid to the second bid based on a difference between the first availability and the second availability, the adjusting comprising:
    whenever the second availability is less than the first availability, decreasing an amount of the first bid by a quantity that is proportional to the difference between the first availability and the second availability; and
    whenever the second availability is greater than the first availability, increasing the amount of the first bid by a quantity that is proportional to the difference between the first availability and the second availability; and
  transmitting, by the one or more computing devices and to the advertising platform system, the second bid for the auction.

2. The method of claim 1, wherein the first and second reservation calendars are generated by a reservation website associated with the merchant computing system, and wherein one or more customers of the merchant computing system may make reservations via the reservation website.

3. The method of claim 1, wherein the first and second reservation calendars are generated by the one or more computing devices based on data received from the merchant computing system.

4. The method of claim 1, wherein the first and second reservation calendars do not comprise availability data, wherein the first and second reservation calendars comprise raw reservations data, and the method further comprising:
  determining, by the one or more computing devices and based on the raw reservations data of the first reservation calendar, the first availability; and
  determining, by the one or more computing devices and based on the raw reservations data of the second reservation calendar, the second availability.

5. The method of claim 1, further comprising receiving, by the one or more computing devices and from the advertising platform system, a notice of an incomplete status of the auction, and wherein the second bid is determined in response to receiving the notice of the incomplete status of the auction.

6. The method of claim 1, further comprising:
receiving, by the one or more computing devices and from the advertising platform system, a notice of a completed auction wherein the merchant computing system's bid wins the auction; and
transmitting, by the one or more computing devices and to the merchant computing system, the notice of the completed auction.

7. A computer program product, comprising:
a non-transitory computer-readable medium having computer-readable program instructions embodied thereon that when executed by a computer cause the computer to adjust a bid in an electronic auction for an electronic advertisement space based on merchant system availability, the computer-readable program instructions comprising:
  computer-readable program instructions to receive, from a merchant computing system, first reservation information, the first reservation information comprising a first availability for a service of the merchant computing system for a predefined period of time;
  computer-readable program instructions to determine, based on the first availability, a first bid for an electronic auction for an electronic advertising space with an advertising platform system;
  computer-readable program instructions to transmit, to the advertising platform system, the first bid for the auction;
  computer-readable program instructions to receive, from the merchant computing system, second reservation information comprising a second availability for the service of the merchant computing system for the predefined period of time, wherein the second availability is different from the first availability;
  computer-readable program instructions to determine, based on the second availability, a second bid for the auction, including:
    adjusting the first bid to the second bid based on a difference between the first availability and the second availability, the adjusting comprising:
      whenever the second availability is less than the first availability, decreasing an amount of the first bid by a quantity that is proportional to the difference between the first availability and the second availability; and
      whenever the second availability is greater than the first availability, increasing the amount of the first bid by a quantity that is proportional to the difference between the first availability and the second availability; and
  computer-readable program instructions to transmit, to the advertising platform system, the second bid for the auction.

8. The computer program product of claim 1, further comprising computer-readable program instructions to receive, from the merchant computing system, statistical information, the statistical information indicating an average length of time users make reservations before time of performance of service associated with the reservations, and wherein the first and second bids are further determined based on the received statistical information.

9. The computer program product of claim 7, wherein the first reservation information comprises a first reservation calendar and the second reservation information comprises a second reservation calendar.

10. The computer program product of claim 7, further comprising computer-readable program instructions to receive, from the merchant computing system, bidding parameters, the bidding parameters comprising at least one of a minimum bid, a maximum bid, and a threshold change in availability and wherein the first and second bids are determined further based on the received bidding parameters.

11. The computer program product of claim 7, wherein the first and second reservation information are generated by a reservation website associated with the merchant computing system, wherein one or more customers of the merchant computing system may make reservations via the reservation website.

12. The computer program product of claim 7, wherein the first and second reservation information do not comprise availability data, wherein the first and second reservation information comprise raw reservations data, and further comprising:
computer-readable program instructions to determine, based on the raw reservations data of the first reservation information, the first availability; and
computer-readable program instructions to determine, based on the raw reservations data of the second reservation information, the second availability.

13. The computer program product of claim 7, further comprising computer-program instructions to receive, from the advertising platform system, a notice of an incomplete status of the auction and wherein the second bid is determined in response to receiving the notice of the incomplete status of the auction.

14. The computer program of claim 7, further comprising:
computer-program instructions to receive, from the advertising platform system, a notice of a completed auction wherein the merchant computing system's bid wins the auction; and
computer-program instructions to transmit, to the merchant computing system, the notice of the completed auction.

15. A system to adjust a bid in an electronic auction for an electronic advertisement space based on merchant system availability, comprising:
a storage device; and
a processor communicatively coupled to the storage device, wherein the processor executes application code instructions that are stored in the storage device to cause the system to:
receive, from a merchant computing system, a first reservation calendar, the first reservation calendar comprising a first availability for a service of the merchant computing system for a predefined period of time;
determine, based on the first availability, a first bid for an electronic auction for an electronic advertising space with an advertising platform system;
transmit, to the advertising platform system, the first bid for the auction
receive, from the merchant system, a second reservation calendar comprising a second availability for the service of the merchant computing system for the predefined period of time, wherein the second availability is different from the first availability;
determine, based on the second availability, a second bid for the auction, including:
adjusting the first bid to the second bid based on a difference between the first availability and the second availability, the adjusting comprising:
whenever the second availability is less than the first availability, decreasing an amount of the first bid by a quantity that is proportional to the difference between the first availability and the second availability; and
whenever the second availability is greater than the first availability, increasing the amount of the first bid by a quantity that is proportional to the difference between the first availability and the second availability; and
transmit, to the advertising platform system, the second bid for the auction.

16. The system of claim 15, wherein the processor is further configured to execute computer-readable program instructions stored in the storage device to cause the system to receive, from the merchant system, the statistical information indicating a statistical distribution of users with respect to the length of time users make reservations before time of performance of service associated with the reservations, wherein statistical information and wherein determining the first and second bids is further based on the received statistical information.

17. The system of claim 15, wherein the processor is further configured to execute computer-readable program instructions stored in the storage device to cause the system to receive, from the merchant system, bidding parameters, the bidding parameters comprising at least one of a minimum bid, a maximum bid, and a threshold change in availability and wherein the first and second bids are determined further based on the received bidding parameters.

18. The system claim 15, wherein the first and second reservation calendars do not comprise availability data, wherein the first and second reservations calendars comprise raw reservations data, and wherein the processor is further configured to execute computer-readable program instructions stored in the storage device to cause the system to:
determine, based on the raw reservations data of the first reservation calendar, the first availability; and
determine, based on the raw reservations data of the second reservation calendar, the second availability.

19. The system of claim 15, wherein the processor is further configured to execute computer-readable program instructions stored in the storage device to cause the system to receive, from the advertising platform system, a notice of an incomplete status of the auction and wherein the second bid is determined in response to receiving the notice of the incomplete status of the auction.

20. The method of claim 1, further comprising reducing interactions between the one or more computing devices associated with the advertising system and the merchant computing system by providing, to the one or more computing devices associated with the advertising system, access to a reservation calendar of the merchant computing system from which the first reservation calendar and the second reservation calendar are generated.

* * * * *